(12) United States Patent
Tax et al.

(10) Patent No.: US 11,989,278 B2
(45) Date of Patent: *May 21, 2024

(54) METHOD AND SYSTEM FOR OBTAINING CONSENT TO PERFORM AN OPERATION

(71) Applicant: The Toronto-Dominion Bank, Toronto (CA)

(72) Inventors: David Samuel Tax, Toronto (CA); Harjot Singh Panag, Brampton (CA); Kevin Wayne Faragher, Toronto (CA); Milos Dunjic, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,517

(22) Filed: Mar. 7, 2023

(65) Prior Publication Data

US 2023/0205861 A1    Jun. 29, 2023

Related U.S. Application Data

(63) Continuation of application No. 17/004,543, filed on Aug. 27, 2020, now Pat. No. 11,636,194.

(51) Int. Cl.
*G06F 21/36* (2013.01)
*G06F 3/0482* (2013.01)
(Continued)

(52) U.S. Cl.
CPC ............ *G06F 21/36* (2013.01); *G06F 3/0482* (2013.01); *G06F 21/6209* (2013.01); *H04L 9/0643* (2013.01); *H04L 9/50* (2022.05)

(58) Field of Classification Search
CPC .... G06F 3/0482; G06F 21/36; G06F 21/6209; H04L 9/0643
See application file for complete search history.

(56) References Cited

U.S. PATENT DOCUMENTS 7,516,100 B1    4/2009    Anuszewski et al.
7,657,464 B1    2/2010    Yeung et al.
(Continued)

FOREIGN PATENT DOCUMENTS

WO    2016025943 A1    2/2016

*Primary Examiner* — Seth A Silverman
(74) *Attorney, Agent, or Firm* — Rowand LLP

(57) ABSTRACT

A server comprises a communications module; a processor coupled with the communications module; and a memory coupled to the processor and storing processor-executable instructions which, when executed by the processor, configure the processor to receive, via the communications module and from a computing device, a signal representing a request to add an authorized user to an account of an entity hosted by a first institution associated with the server; send, via the communications module and to a second server associated with a second institution hosting an account of the authorized user, a signal that includes a unique key and an identifier of the entity, the signal causing the second server to store the unique key and the identifier in memory and associating the unique key and the identifier with the account of the authorized user; receive a signal representing a request to perform an operation for the entity; in response to receiving the request to perform the operation, send, via the communications module and to a digital identity network, a request for a unique key associated with the entity; receive, via the communications module and from the digital identity network, the unique key; and in response to receiving the unique key, perform the operation.

26 Claims, 13 Drawing Sheets

(51) Int. Cl.
*G06F 21/62* (2013.01)
*H04L 9/06* (2006.01)
*H04L 9/00* (2022.01)

(56) References Cited

U.S. PATENT DOCUMENTS

| | | | |
|---|---|---|---|
| 8,434,133 B2 | 4/2013 | Kulkarni et al. | |
| 8,706,577 B2 | 4/2014 | Stringfellow et al. | |
| 9,563,894 B2 | 2/2017 | Subramanian et al. | |
| 2006/0015358 A1* | 1/2006 | Chua | G06Q 20/40 705/44 |
| 2007/0250920 A1* | 10/2007 | Lindsay | G06F 21/31 726/7 |
| 2009/0259588 A1* | 10/2009 | Lindsay | G06F 21/31 705/40 |
| 2016/0048846 A1* | 2/2016 | Douglas | G06F 16/23 705/318 |
| 2018/0176195 A1* | 6/2018 | Pangam | G06F 21/45 |
| 2019/0268153 A1 | 8/2019 | Kurian | |
| 2020/0204560 A1* | 6/2020 | Yang | H04L 9/3073 |

\* cited by examiner

METHOD AND SYSTEM FOR OBTAINING CONSENT TO PERFORM AN OPERATION

CROSS-REFERENCE TO RELATED APPLICATIONS

This application is a continuation of U.S. patent application Ser. No. 17/004,543, filed on Aug. 27, 2020, the entire contents of which are incorporated herein by reference.

TECHNICAL FIELD

The present application relates to databases, and, more particularly, to identity providing systems and, even more particularly, to methods and systems for obtaining consent to perform an operation.

BACKGROUND

Entities may require consent from one or more authorized users to complete an operation. For example, an entity may require consent from an authorized user to send a transfer from an account of the entity. Obtaining consent from the authorized user may be difficult as the authorized user must be physically present to provide the consent.

A request for consent may be sent digitally or electronically, however this may be unsecure as the user providing consent may not be verified as the authorized user.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
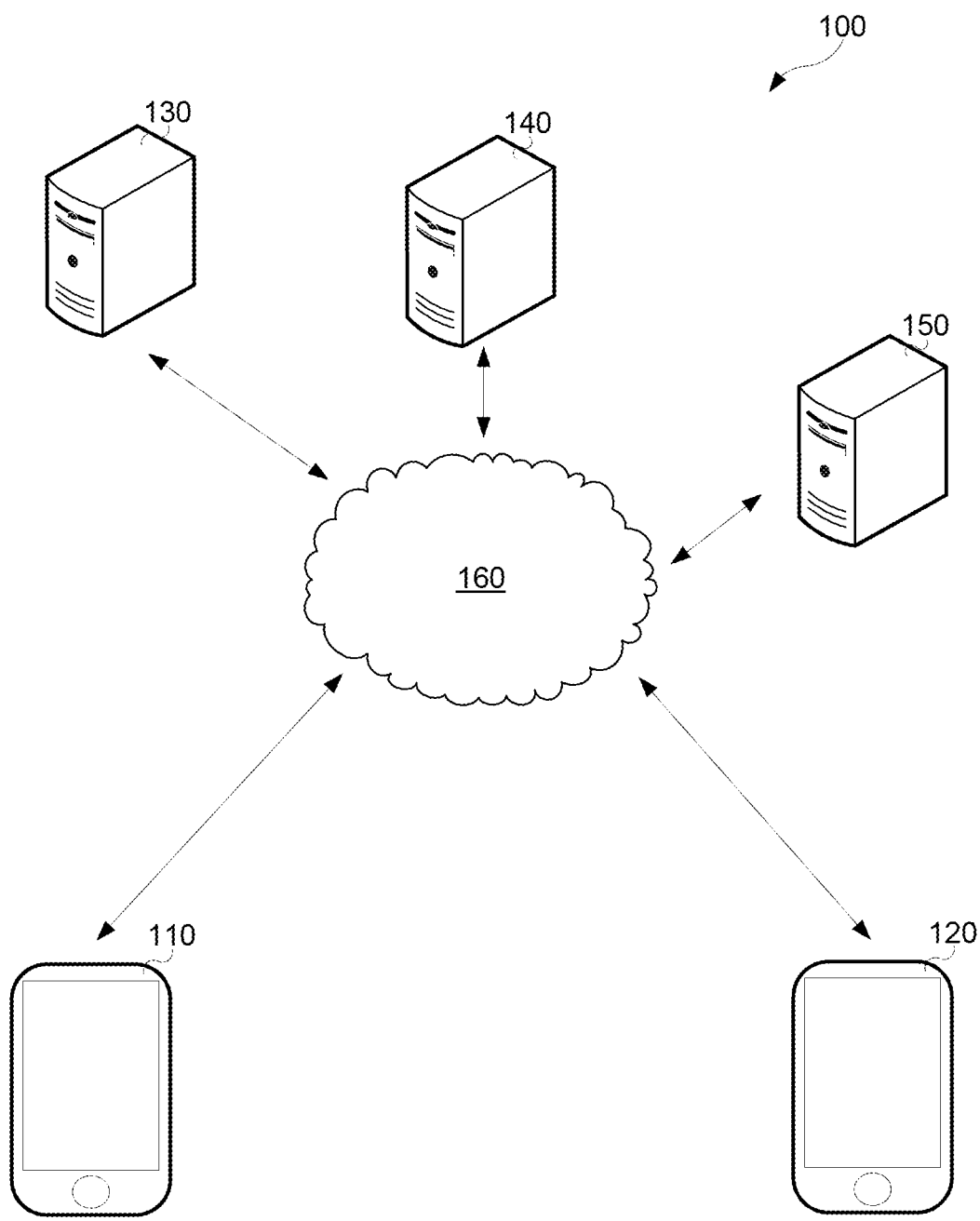
FIG. 1 is a schematic operation diagram illustrating an operating environment of an example embodiment.

Accordingly, in one aspect there is provided a server comprising a communications module; a processor coupled with the communications module; and a memory coupled to the processor and storing processor-executable instructions which, when executed by the processor, configure the processor to receive, via the communications module and from a computing device, a signal representing a request to add an authorized user to an account of an entity hosted by a first institution associated with the server; send, via the communications module and to a second server associated with a second institution hosting an account of the authorized user, a signal that includes a unique key and an identifier of the entity, the signal causing the second server to store the unique key and the identifier in memory and associating the unique key and the identifier with the account of the authorized user; receive a signal representing a request to perform an operation for the entity; in response to receiving the request to perform the operation, send, via the communications module and to a digital identity network, a request for a unique key associated with the entity; receive, via the communications module and from the digital identity network, the unique key; and in response to receiving the unique key, perform the operation.

In one or more embodiments, the processor-executable instructions, when executed by the processor, further configure the processor to send, via the communications module and to a remote device associated with the authorized user, a link which, when selected, directs the remote device to authenticate the authorized user at the second institution.

In one or more embodiments, the processor-executable instructions, when executed by the processor, further configure the processor to receive, via the communications module and from the remote device of the authorized user, a signal indicating that the authorized user has been authenticated by the second institution; and in response to receiving the signal indicating that the authorized user has been authenticated, send the signal including the unique key and the identifier of the entity to the second institution.

In one or more embodiments, the signal indicating that the authorized user has been authenticated includes an identifier of the second institution.

In one or more embodiments, the unique key is received from the digital identity network in a blind manner such that the first institution does not know an identity of the second institution and the second institution does not know an identity of the first institution.

In one or more embodiments, the processor-executable instructions, when executed by the processor, further configure the processor to in response to receiving the request to add the authorized user, generate the unique key and the identifier of the entity.

In one or more embodiments, the unique key is received from the second institution when the authorized user has indicated consent to the operation.

In one or more embodiments, the signal representing the request to add the authorized user to the account of the entity includes one or more parameters defining permissions granted to the authorized user.

In one or more embodiments, the permissions include at least one of sending payments, sending payments only to defined parties, and sending payments less than a threshold amount.

In one or more embodiments, the unique key is one of a plurality of unique keys, each unique key being associated with a different authorized user and wherein the operation is performed when all unique keys have been received.

According to another aspect there is provided a method comprising receiving, via a communications module and from a computing device, a signal representing a request to add an authorized user to an account of an entity hosted by a first institution associated with a first server; sending, via the communications module and to a second server associated with a second institution hosting an account of the authorized user, a signal that includes a unique key and an identifier of the entity, the signal causing the second server to store the unique key and the identifier in memory and associating the unique key and the identifier with the account of the authorized user; receiving a signal representing a request to perform an operation for the entity; in response to receiving the request to perform the operation, sending a request, via the communications module and to a digital identity network, for a unique key associated with the entity; receiving, via the communications module and from the digital identity network, the unique key; and in response to receiving the unique key, performing the operation.

In one or more embodiments, the method further comprises sending, via the communications module and to a remote device associated with the authorized user, a link which, when selected, directs the remote device to authenticate the authorized user at the second institution.

In one or more embodiments, the method further comprises receiving, via the communications module and from the remote device of the authorized user, a signal indicating that the authorized user has been authenticated by the second institution; and in response to receiving the signal indicating that the authorized user has been authenticated, sending the signal including the unique key and the identifier of the entity to the second institution.

In one or more embodiments, the signal indicating that the authorized user has been authenticated includes an identifier of the second institution.

In one or more embodiments, the unique key is received from the digital identity network in a blind manner such that the first institution does not know an identity of the second institution and the second institution does not know an identity of the first institution.

In one or more embodiments, the method further comprises in response to receiving the request to add the authorized user, generating the unique key and the identifier of the entity.

In one or more embodiments, the unique key is received from the second institution when the authorized user indicated consent to the operation.

In one or more embodiments, the signal representing the request to add the authorized user to the account of the entity includes one or more parameters defining permissions granted to the authorized user.

In one or more embodiments, the unique key is one of a plurality of unique keys, each unique key being associated with a different authorized user and wherein the operation is performed when all unique keys have been received.

According to another aspect there is provided a non-transitory computer readable storage medium comprising computer-executable instructions which, when executed, configure a processor to receive, via a communications module and from a computing device, a signal representing a request to add an authorized user to an account of an entity hosted by a first institution associated with a first server; send, via the communications module and to a second server associated with a second institution hosting an account of the authorized user, a signal that includes a unique key and an identifier of the entity, the signal causing the second server to store the unique key and the identifier in memory and associating the unique key and the identifier with the account of the authorized user; receive a signal representing a request to perform an operation for the entity; in response to receiving the request to perform the operation, send a request, via the communications module and to a digital identity network, for a unique key associated with the entity; receive, via the communications module and from the digital identity network, the unique key; and in response to receiving the unique key, perform the operation.

According to another aspect there is provided a server comprising a communications module; a processor coupled with the communications module; and a memory coupled to the processor and storing processor-executable instructions which, when executed by the processor, configure the processor to authenticate a user; send, to a server of a first institution, a signal indicating that the user has been authenticated; receive, from the server, a signal that includes a unique key and an identifier of an entity; and associate the unique key and the identifier of the entity with the authenticated user and store in memory.

In one or more embodiments, the processor-executable instructions further configure the processor to receive, from a digital identity network, a request for the unique key indicating consent to perform an operation on an account at the first institution, the request including the identifier of the entity; send, to a remote device, a signal requesting consent to perform the operation thus release the unique key; receive, from the remote device, a signal indicating consent to perform the operation and thus release the unique key; and send, to the digital identity network, a signal including the unique key.

According to another aspect there is provided a method comprising authenticating a user; sending, to a server of a first institution, a signal indicating that the user has been authenticated; receiving, from the server, a signal that includes a unique key and an identifier of an entity; and associating the unique key and the identifier of the entity with the authenticated user and storing in memory.

In one or more embodiments, the method comprises receiving, from a digital identity network, a request for the unique key indicating consent to perform an operation on an account at the first institution, the request including the identifier of the entity; sending, to a remote device, a signal requesting consent to perform the operation thus release the unique key; receiving, from the remote device, a signal indicating consent to perform the operation and thus release the unique key; and sending, to the digital identity network, a signal including the unique key.

According to another aspect there is provided a non-transitory computer readable storage medium comprising computer-executable instructions which, when executed, configure a processor to authenticate a user; send, to a server of a first institution, a signal indicating that the user has been authenticated; receive, from the server, a signal that includes a unique key and an identifier of an entity; and associate the unique key and the identifier of the entity with the authenticated user and store in memory.

Methods and systems for obtaining consent to perform an operation are described below. In one or more embodiments, consent may be obtained by acquiring one or more unique keys through a digital identity network. In one or more embodiments, a permissioned blockchain network may be used to provide the digital identity network. The permissioned blockchain network may only allow blocks to be written to a blockchain by nodes that are granted permission to write to the blockchain. At least some such blocks may be related to digital identity data. For example, at least some blocks may store a private secret, such as a hash of certain identity-related data. The identity-related data may be stored off-chain but the blockchain may be used to effectively provide proof of the data.

A first server associated with an institution that hosts an account of an entity receives a request to perform an operation for the entity. The first server sends a request to a digital identity network for a unique key associated with the entity. The digital identity network sends a request to other servers associated with institutions that are part of the digital identity network. A second server associated with the institution storing the unique key obtains consent from an authorized user to perform the operation and in response, sends the unique key to the digital identity network. The digital identity network sends the unique key to the first server, indicating consent to perform the operation. In response to receiving the unique key, the first server performs the operation.

Some or all of the above features may be provided by some embodiments.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a block diagram illustrating an operating environment of an example embodiment. Various components cooperate to provide a digital identity system 100 which may be used, for example, to obtain consent to perform an operation. As shown, the digital identity system 100 includes a first computing device 110, a second computing device 120, a first server 130, a second server 140 and a digital identity network 150 coupled to one another through a network 160, which may include a public network such as the Internet and/or a private network.

The first server 130 is associated with a first institution and the second server 140 is associated with a second institution. The first server 130 and the second server 140 may be referred to as data transfer servers and may be configured to transfer data between data records in a database. The first server 130 may maintain data records for a plurality of entities associated with the first institution and the second server 140 may maintain data records for a plurality of entities associated with the second institution. In at least some embodiments, the first server 130 is a value transfer server or financial institution server which may maintain customer bank accounts for the first institution and the second server 140 is a value transfer server of financial institution server which may maintain customer bank accounts for the second institution. Put another way, the first server 130 may maintain a database that includes various data records for the first institution and the second server 140 may maintain a database that includes various data records for the second institution. A data record may, for example, reflect an amount of value stored in a particular account associated with an entity.

Data may be transferred between data records stored at the different servers. For example, the data may be transferred from a first data record stored at the first server 130 associated with the first institution to a second data record stored at the second server 140 associated with the second institution.

The computing devices 110, 120 may take a variety of forms such as a smartphone, a tablet computer, a wearable computer such as a head-mounted display or smartwatch, a laptop or desktop computer, or a computing device of another type. In certain embodiments, a first user may operate the first computing device 110 to cause the first computing device 110 to perform one or more operations consistent with the disclosed embodiments. A second user may operate the second computing device 120 to cause the second computing device 120 to perform one or more operations consistent with the disclosed embodiments.

The computing devices 110, 120 are adapted to present graphical user interfaces that allow for communication with the servers 130, 140, respectively. For example, the first computing device 110 may be adapted to send, to the first server 130, a signal representing a request to add an authorized user to an account of an entity hosted by the first institution associated with the first server 130. The second computing device 120 may be adapted to receive, from the first server 130, a signal that includes a unique key and an identifier of the entity. The second computing device 120 may be adapted to send a signal to the second server 140 to store the unique key and the identifier in memory and associate the unique key and the identifier with the account of the second (authorized) user.

The first server 130 may be adapted to receive, from the first computing device 110, the signal representing the request to add the authorized user to the account of the entity. The first server 130 may be adapted to generate the unique key and the identifier of the entity and may send a signal to the second computing device 120 including the unique key and the identifier of the entity. The first server 130 may be adapted to receive, from the first computing device 110, a request to perform an operation for the entity. In response to receiving the request to perform the operation, the first server 130 may be adapted to send a signal indicating a request to the digital identity network 150 for a unique key associated with the entity and receive, from the digital identity network 150, the unique key. In response to receiving the unique key, the first server 130 may be adapted to perform the operation.

The second server 140 may be adapted to receive, from the second computing device 120, a signal to store the unique key and the identifier in memory and to associate the unique key and the identifier with the account of the second user. The second server 140 may be adapted to receive, from the digital identity network 150, a signal indicating a request for the unique key and may send, to the digital identity network 150, the unique key.

The digital identity system 100 may be used to obtain, via the digital identity network 150, consent to perform an operation for an entity. The digital identity network 150 is illustrated with a single block but it may be a network consisting of numerous computer systems. For example, the digital identity network may be a blockchain network which includes a number of nodes. The blockchain network is a decentralized peer-to-peer network in which nodes may maintain respective copies of an append-only ledger.

The blockchain network may be a permissioned blockchain network in which only authorized nodes are permitted to add blocks to the blockchain. For example, only verified nodes may be granted permission to write to the blockchain. The verified nodes may be trusted nodes such as nodes associated with government organizations or other trusted entities such as banks. By way of example, the verified nodes may be associated with a driver's license bureau, a credit bureau, a government identity issuing office such as an entity registry office, or an office of another type. Given ones of these nodes may maintain identity records of various types. For example, a node associated with a passport office may maintain digital passport records, a node associated with a driver's license bureau may maintain digital licensing records, a node associated with a credit bureau may maintain digital credit records, and a node associated with a bank may maintain digital banking records. Various verified nodes may maintain contact information records which may, for example, specify an email address, postal address, telephone number, or other type of contact information.

Accordingly, at least some verified nodes may write to the blockchain. At least some of the blocks written to the blockchain may be related to entity identity data. The digital identity network 150 may store entity identity data associated with a plurality of entities. In at least some embodiments, entity identity data representing entity information may not be included in the blockchain. Instead, the blocks may store a private secret that is related to such entity identity data. The private secret may act as proof to the existence of the entity identity data and may be used to verify the authenticity of the data. For example, in at least some embodiments, the private secret may be a hash of the entity identity data such that, when the entity identity data is provided to another system (i.e., a system apart from the verified node maintaining the entity identity data), it may be verified from the hash stored in a block on the blockchain.

The blockchain network may, for example, be implemented using Hyperledger Fabric, for example. It will, however, be appreciated that the blockchain network may take other forms.

Within the digital identity network 150, trusted partners such as the first institution and the second institution may act as digital asset providers and digital asset consumers. In actions as a digital asset provider, a trusted member of the digital identity network 150 may provide information about a particular entity to another trusted member of the digital identity network 150 (e.g. a digital asset consumer). The information about a particular entity may include a unique key associated with the entity. The unique key may indicate consent to perform an operation for the entity. The requested information may be provided through the digital identity network 150 such that the digital asset provider does not know the identity of the digital asset consumer and such that the digital asset consumer does not know the identity of the digital asset provider.

The digital identity network 150 may include one or more servers adapted to perform one or more operations consistent with the disclosed embodiments.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, a telecommunications network, or the like.

FIG. 1 illustrates an example representation of components of the digital identity system 100. The digital identity system 100 can, however, be implemented differently than the example of FIG. 1. For example, various components that are illustrated as separate systems in FIG. 1 may be implemented on a common system. By way of further example, the functions of a single component may be divided into multiple components.

Figure 2:
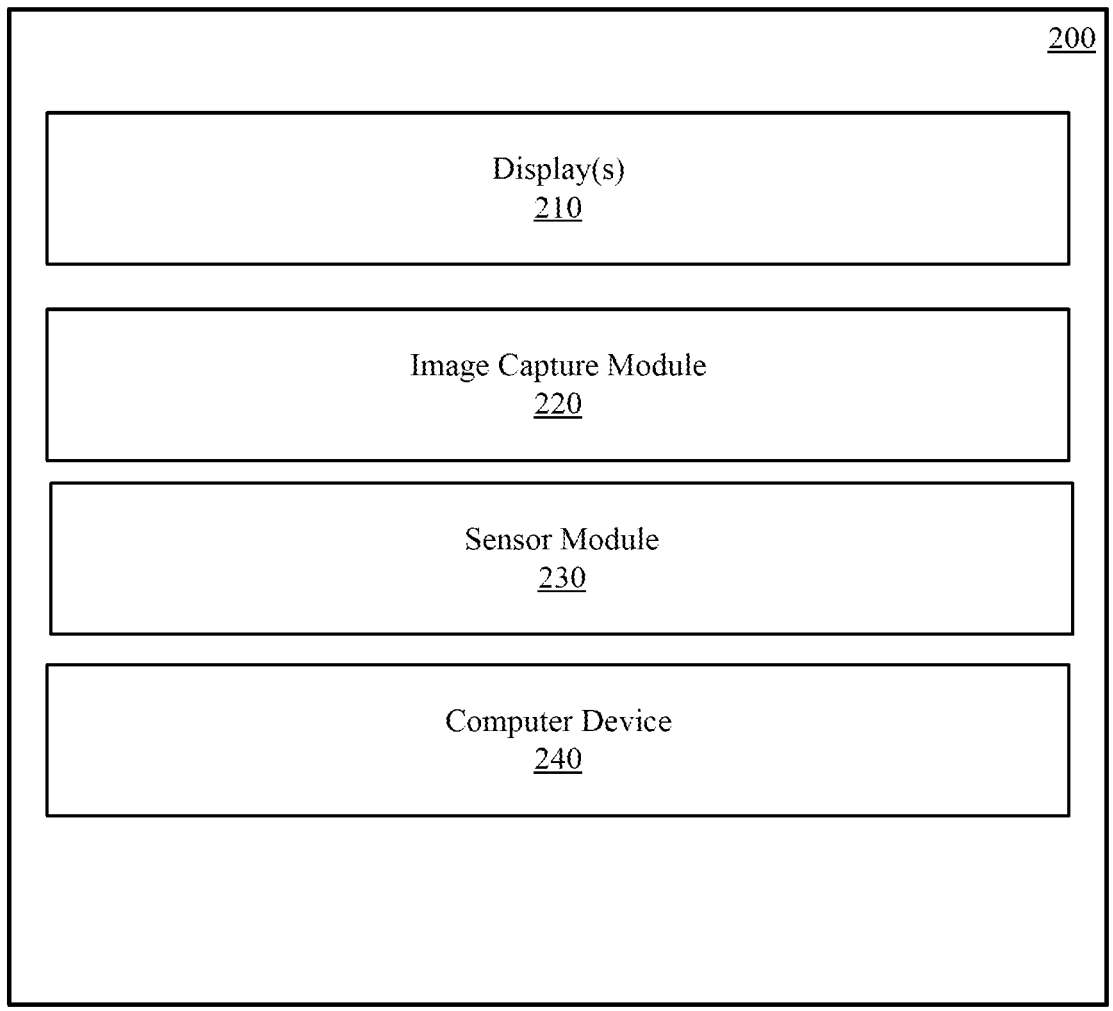
FIG. 2 is a simplified schematic diagram showing components of a computing device.

FIG. 2 is a simplified schematic diagram showing component of an exemplary computing device 200. Computing devices 110, 120 may be of the same type as computing device 200. The computing device 200 may include modules including, as illustrated, for example, one or more displays 210, an image capture module 220, a sensor module 230, and a computer device 240.

The one or more displays 210 are a display module. The one or more displays 210 are used to display screens of a graphical user interface that may be used, for example, to communicate with the digital identity network 150 (FIG. 1). The one or more displays 210 may be internal displays of the computing device 200 (e.g., disposed within a body of the computing device).

The image capture module 220 may be or may include a camera. The image capture module 220 may be used to obtain image data, such as images. The image capture module 220 may be or may include a digital image sensor system as, for example, a charge coupled device (CCD) or a complementary metal-oxide-semiconductor (CMOS) image sensor.

The sensor module 230 may be a sensor that generates sensor data based on a sensed condition. By way of example, the sensor module 230 may be or include a location subsystem which generates location data indicating a location of the computing device 200. The location may be the current geographic location of the computing device 200. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computer device 240 is in communication with the one or more displays 210, the image capture module 220, and the sensor module 230. The computer device 240 may be or may include a processor which is coupled to the one or more displays 210, the image capture module 220, and/or the sensor module 230.

Figure 3:
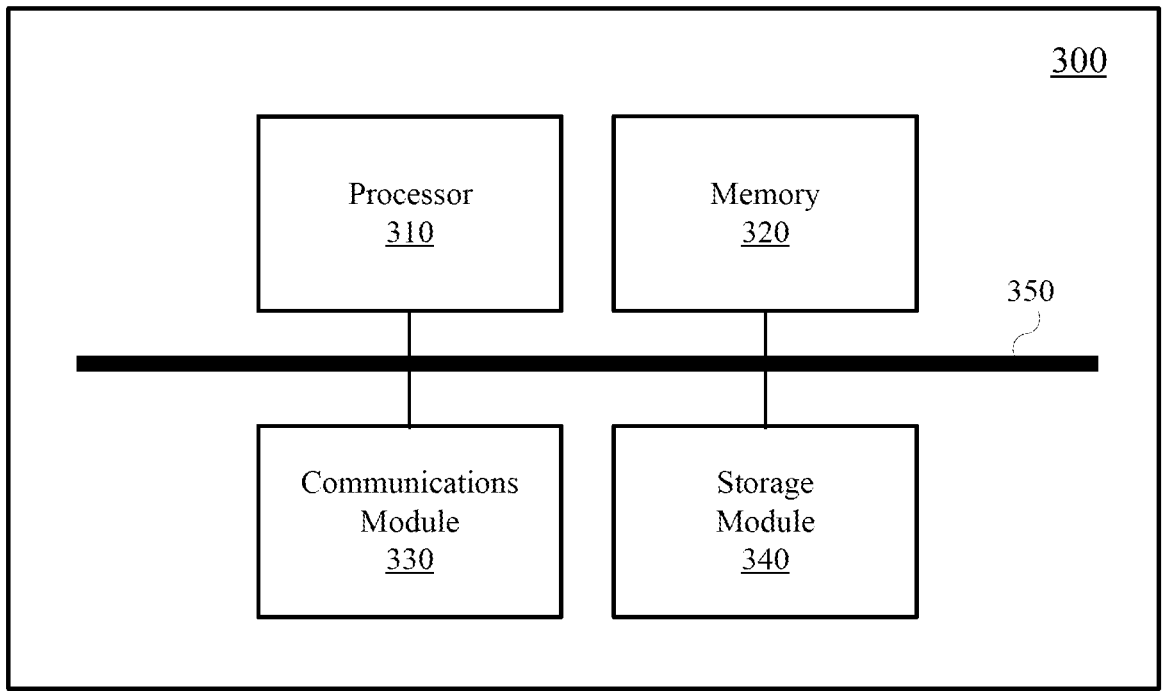
FIG. 3 is a high-level schematic diagram of an example computer device.

Referring now to FIG. 3, a high-level operation diagram of an example computer device 300 is shown. In some embodiments, the computer device 300 may be exemplary of the computer device 240 (FIG. 2), the first server 130, the second server 140 and the digital identity network 150 (or a portion thereof, such as a node of the digital identity network 150).

The example computer device 300 includes a variety of modules. For example, as illustrated, the example computer device 300 may include a processor 310, a memory 320, a communications module 330, and/or a storage module 340. As illustrated, the foregoing example modules of the example computer device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer device 300.

The communications module 330 allows the example computer device 300 to communicate with other computer or computing devices and/or various communications networks. For example, the communications module 330 may allow the example computer device 300 to send or receive communications signals. Communications signals may be sent or received according to one or more protocols or according to one or more standards. For example, the communications module 330 may allow the example computer device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computer device 300 to communicate using near-field communication (NFC), via Wi-Fi™, using Bluetooth™ or via some combination of one or more networks or protocols. In some embodiments, all or a portion of the communications module 330 may be integrated into a component of the example computer device 300. For example, the communications module may be integrated into a communications chipset. In some embodiments, the communications module 330 may be omitted such as, for example, if sending and receiving communications is not required in a particular application.

The storage module 340 allows the example computer device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
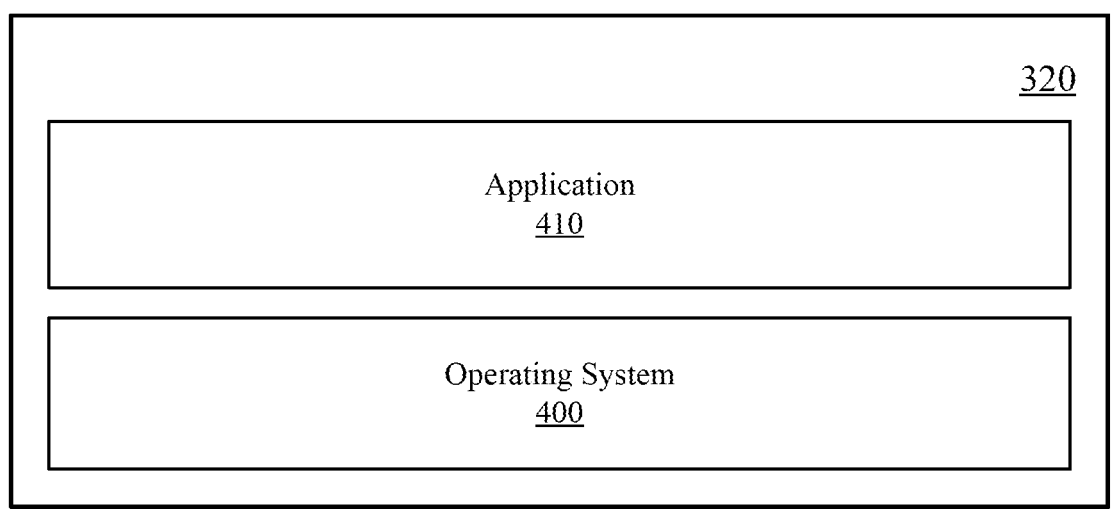
FIG. 4 shows a simplified organization of software components stored in a memory of the example computer device of FIG. 3.

FIG. 4 depicts a simplified organization of software components stored in the memory 320 of the example computer device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computer device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computer device 300, in combination with the operating system 400, to operate as a device performing a particular function. For example, the application 410 may cooperate with the operating system 400 to adapt a suitable embodiment of the example computer device 300 to operate as the computer device 240 (FIG. 2), the first server 130, the second server 140 and/or the digital identity network 150 (or a portion thereof, such as a node of the digital identity network 150).

While a single application 410 is illustrated in FIG. 3, in operation the memory 320 may include more than one application 410 and different applications 410 may perform different operations. For example, in at least some embodiments in which the computer device 300 is functioning as one of the computing devices 110, 120, the applications 410 may include a banking application. The banking application may be configured for secure communications with the servers 130, 140 and may provide various banking functions such as, for example, the ability to display a quantum of value in one or more data records (e.g. display balances), configure transfers of data (e.g. bill payments and other transfers), adding authorized users to the account and other account management functions.

By way of further examples, in at least some embodiments in which the computer system 300 functions as one of the computing devices 110, 120, the applications 410 may include a web browser, which may also be referred to as an Internet browser. In at least some such embodiments, the servers 130, 140 may be web servers that may serve one or more of the interfaces described herein. The web servers may cooperate with the web browser and may serve as an interface when the interface is requested through the web browser. For example, the web browser may serve as a mobile banking interface.

By way of further example, in at least some embodiments in which the computer system 300 functions as one of the computing devices 110, 120, the applications 410 may include an electronic messaging application. The electronic messaging application may be configured to display a received electronic message such as an email message, short messaging service (SMS) message, or a message of another type. In at least some embodiments, the servers 130, 140 may be configured, through computer-executable instructions, to send a message to at least one of the computing devices 110, 120. For example, the first server 130 may be configured to send a SMS message to a phone number associated with the second user and an electronic messaging application on the second computing device 120 may be configured to retrieve the message and display the message to the second user. The message may include a link for authenticating the user at the second institution and storing a unique key and an identifier of an entity in memory.

Figure 5:
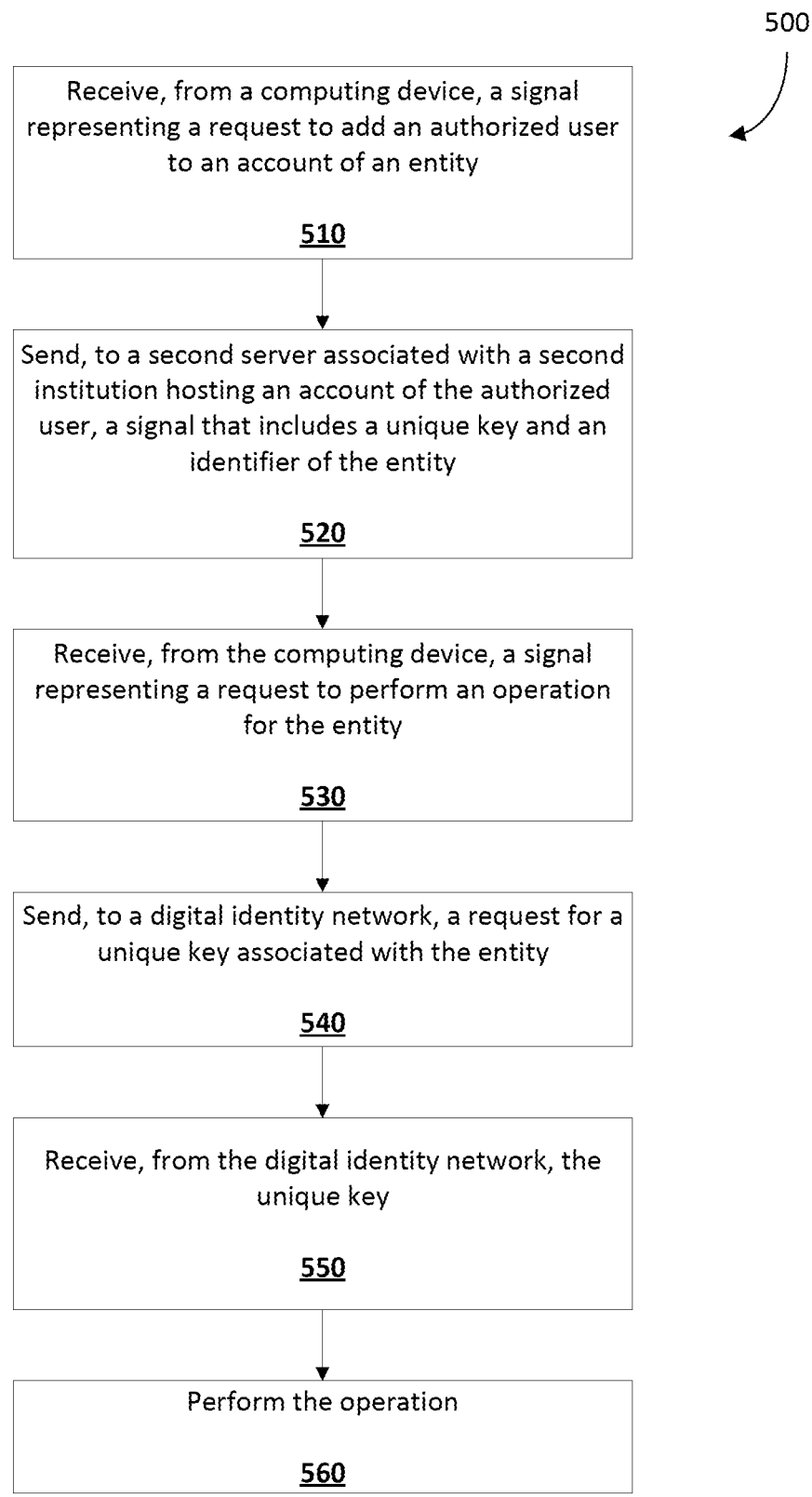
FIG. 5 is a flowchart showing operations performed by a first server in obtaining consent to perform an operation according to an embodiment.

Embodiments of operations performed by the first server 130 will now be described. FIG. 5 is a flowchart showing operations performed by the first server 130 according to an embodiment. The operations may be included in a method 500 which may be performed by the first server 130. For example, computer-executable instructions stored in memory of the first server 130 may, when executed by one or more processors, configure the first server 130 to perform the method 500 or a portion thereof.

The method 500 beings when the first server 130 receives, via the communications module, a signal representing a request to add an authorized user to an account of an entity hosted by the first institution (step 510). The entity may be a business such as for example a corporation, a partnership, etc.

Figure 6:
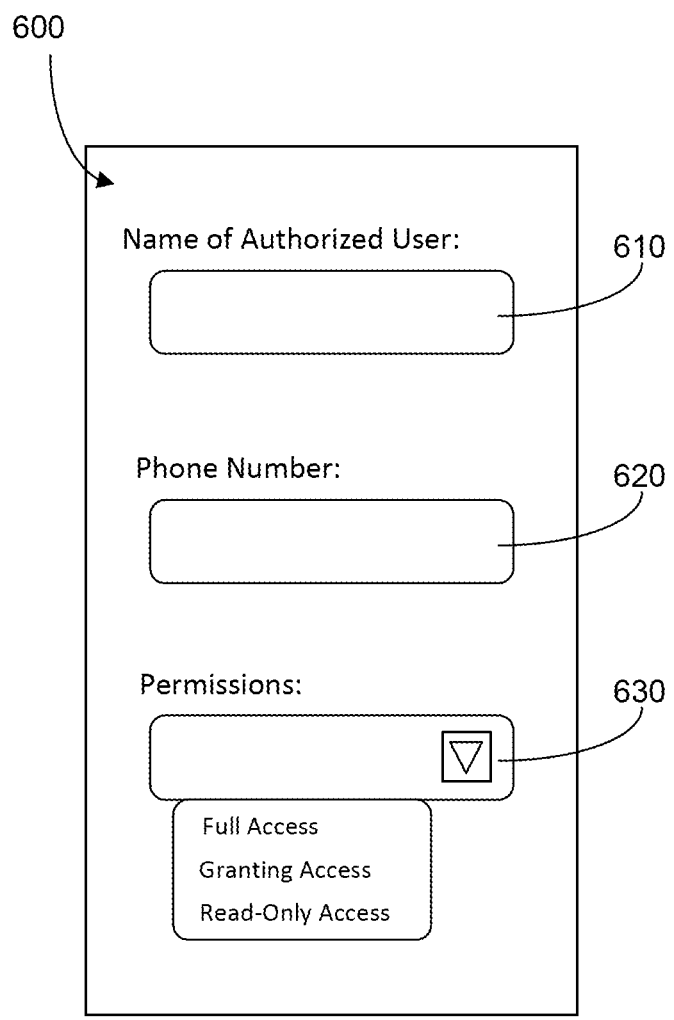
FIG. 6 is an example user interface.

In this embodiment, the request includes a name of the authorized user, contact information of the authorized user, and permissions to be granted to the authorized user. The name of the authorized user, the contact information of the authorized user and the permissions to be granted to the authorized user are set by the first user using a mobile application on the first computing device 110. An example is shown in FIG. 6. As can be seen, within the mobile application, a graphical user interface (GUI) 600 is displayed on the first computing device 110. The GUI 600 allows for manipulation of one or more input fields via an input interface (such as a keyboard and/or touchscreen) associated with the first computing device 110. Touch gestures, for example, may be used to complete each input field. In the example shown in FIG. 6, the GUI 600 includes a first input field 610 which is used to identify the authorized user, a second input field 620 which is used to provide contact information for the authorized user, and a third input field 630 which is used to define permissions granted to the authorized user.

The first input field 610 may be linked to a contact list stored on the first computing device 110. For example, when the first user selects the first input field 610, the first computing device 110 may display the contact list allowing the first user to select the authorized user therefrom via touch input. Once the authorized user is identified, the name of the authorized user may be displayed. The second input field 620 may be automatically populated based on information available through the contact list. For example, the phone number of the authorized user may automatically populate the second input field 620. As another example, the first user may complete the first input field 610 and the second input field 620 by entering the authorized users name and phone number or email address using a keypad associated with or displayed on the first computing device 110.

The third input field 630 may be completed using the input interface associated with the first computing device 110. For example, the first user may select the third input field 630 via touch input and a drop down menu may be provided prompting the user to select one of the options displayed in the drop down menu. The options may be for example "full access", "granting access", "read-only access", etc. When "full access" is selected, the authorized user is to be granted full access to the account of the entity. When "granting access" is selected, the authorized user is permitted to provide consent to grant access to a requested operation performed on the account of the entity. For example, the authorized user may permit a transfer of value from the account requested by someone other than the authorized user. When "read-only access" is selected, the authorized user is permitted to view a balance of the account but is not permitted to authorize transfers of value into or out of the account. As another example, the third input field 630 may require input indicating an amount of value permitted to be authorized by the authorized user. For example, an amount of "$2500" indicates that the authorized user is permitted to authorize a transfer of value out of the account in the amount of $2500 or less. Other examples of permissions that may be granted to the authorized user include sending payments, sending payments only to defined parties, and sending payments less than a threshold amount.

It will be appreciated that other types of input fields may be used such as for example radio buttons, text boxes, etc. Previously entered inputs may be stored by the first server 130 such that they are available to the user when adding a new authorized user. In another example, permissions granted to one authorized user may be applied to another authorized user. In this example, once permissions have been set up for the one authorized user, the first server 130 may provide an option to the first user to grant the same permissions to another authorized user.

Once the request to add the authorized user to an account of the entity has been received, the first server 130 generates a unique key that is associated with the account of the entity. The unique key may be required by the first server 130 to perform an operation. For example, the unique key may be used to indicate consent by the authorized user to perform the operation. In this embodiment, the unique key may be for example a unique identification number that is randomly generated by the first server 130.

The first server 130 sends, via the communications module and to the second server 140, a signal that includes the unique key and an identifier of the entity (step 520). As mentioned, the unique key may be used to indicate consent by the authorized user to perform the operation. The identifier of the entity may include a name of the entity and/or an account number of the entity.

Figure 7:
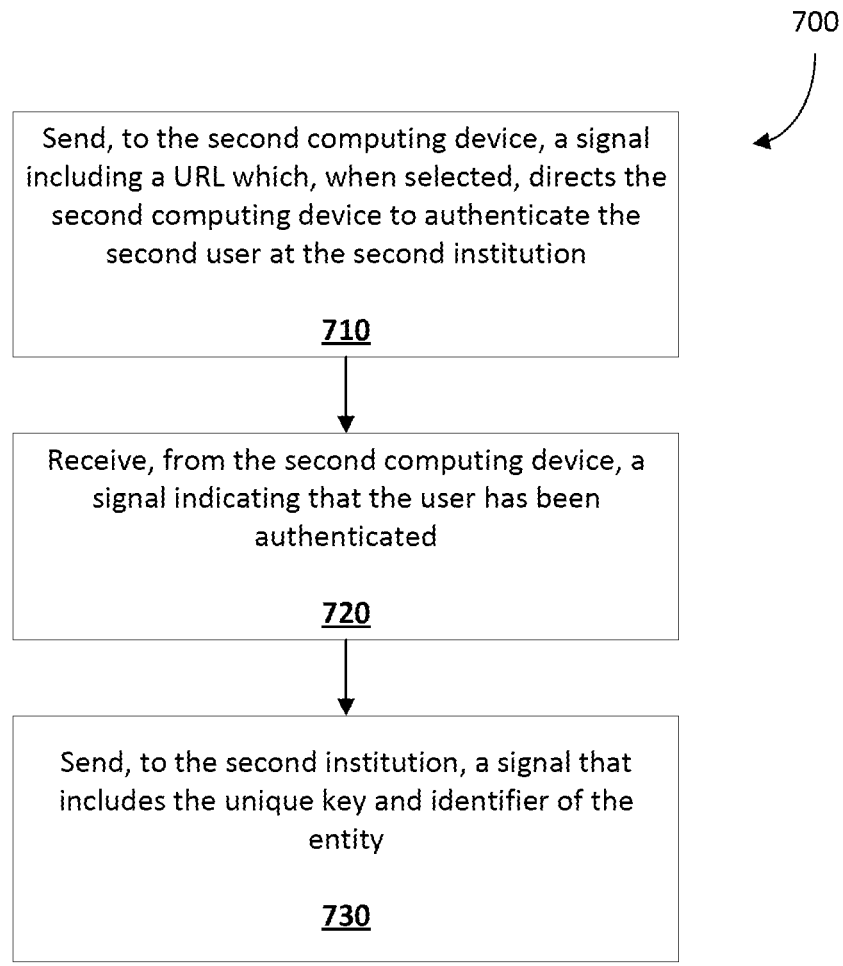
FIG. 7 is a flowchart showing operations performed by a first server in sending a unique key to a second server according to an embodiment.

FIG. 7 is a flowchart showing operations performed by the first server 130 to send the signal that includes the unique key and the identifier of the entity according to an embodiment. The operations may be included in a method 700 which may be performed by the first server 130. For example, computer-executable instructions stored in memory of the first server 130 may, when executed by one or more processors, configure the first server 130 to perform the method 700 or a portion thereof.

The first server 130 sends, via the communications module and to the second computing device 120, a signal that includes a link which, when selected, directs the second computing device 120 to authenticate the second user at the second institution (step 710). The signal that includes the link is sent to the second computing device 120 based on information provided during step 510. For example, the link may be sent via text message to the phone number of the authorized user or may be sent via email using the email address of the authorized user.

The link may, for example, be a uniform resource locator (URL) and may be configured to authenticate the user using credentials entered by the second user. For example, the link, when selected, may direct the second computing device 120 to a login webpage associated with the second institution or a mobile application associated with the second institution. In this example, the second computing device 120 may know which institution the authorized user has an account with and may redirect to the login page or the mobile application of that particular institution. The user may be required to input authorization information such as a secret (e.g., a password, a personal identification number, etc.), or other identifying data such as, for example, biometric data such as a fingerprint.

In another example, the link, when selected, may direct the second computing device 120 to a webpage listing known institutions and may prompt the authorized user to select the institution of which they have an account with.

Once selected, the second computing device 120 may redirect to the login page or the mobile application of the selected institution.

The first server 130 receives, via the communications module and from the second server 140, a signal indicating that the user has been authenticated (step 720). The signal may include identifying information of the second institution. For example, the signal may include an account number of the authorized user which includes identifying information of the second institution.

The first server 130 sends, send, via the communications module and to the second server 140, a signal that includes the unique key and the identifier of the entity (step 730). The signal causes the second server 140 to store the unique key and the identifier in memory and associate the unique key and the identifier with the account of the authorized user.

The unique key generated by the first institution is stored in memory by the second institution in a manner such that it is associated with the account of the authorized user at the second institution. As will be described, the authorized user may log into their account at the second institution to indicate consent to an operation to be performed on the first account at the first institution. The authorized user is not required to log into the first account at the first institution. In one example, the entity may be a business such as a corporation, partnership, etc. The first account may be a business bank account associated with the entity. The authorized user may be an employee of the business and may have a personal bank account at the second institution. The authorizes user may use their personal bank account (at the second institution) to authorize an operation on behalf of the business (at the first institution).

The first server 130 receives, via the communications module, a request to perform an operation for the entity (step 530). In this embodiment, the request is received from the first computing device 110 however it will be appreciated that the request may be received by any computing device. The request may be submitted by the first user through a mobile application on the first computing device 110.

The operation may be a banking operation such as a request to transfer funds from the account of the entity hosted by first server 130 (at the first institution). The request may include a transfer amount and may indicate a recipient of the transfer. Other examples of banking operations that may be requested include adjusting credit limits, issuing new credit cards, etc.

The first server 130 sends, via the communications module and to the digital identity network 150, a request for a unique key associated with the entity (step 540). In this embodiment, the request is a digital identity request and includes an identifier of the entity. The request may include information regarding the request operation and may include the name of the authorized user.

Figure 8:
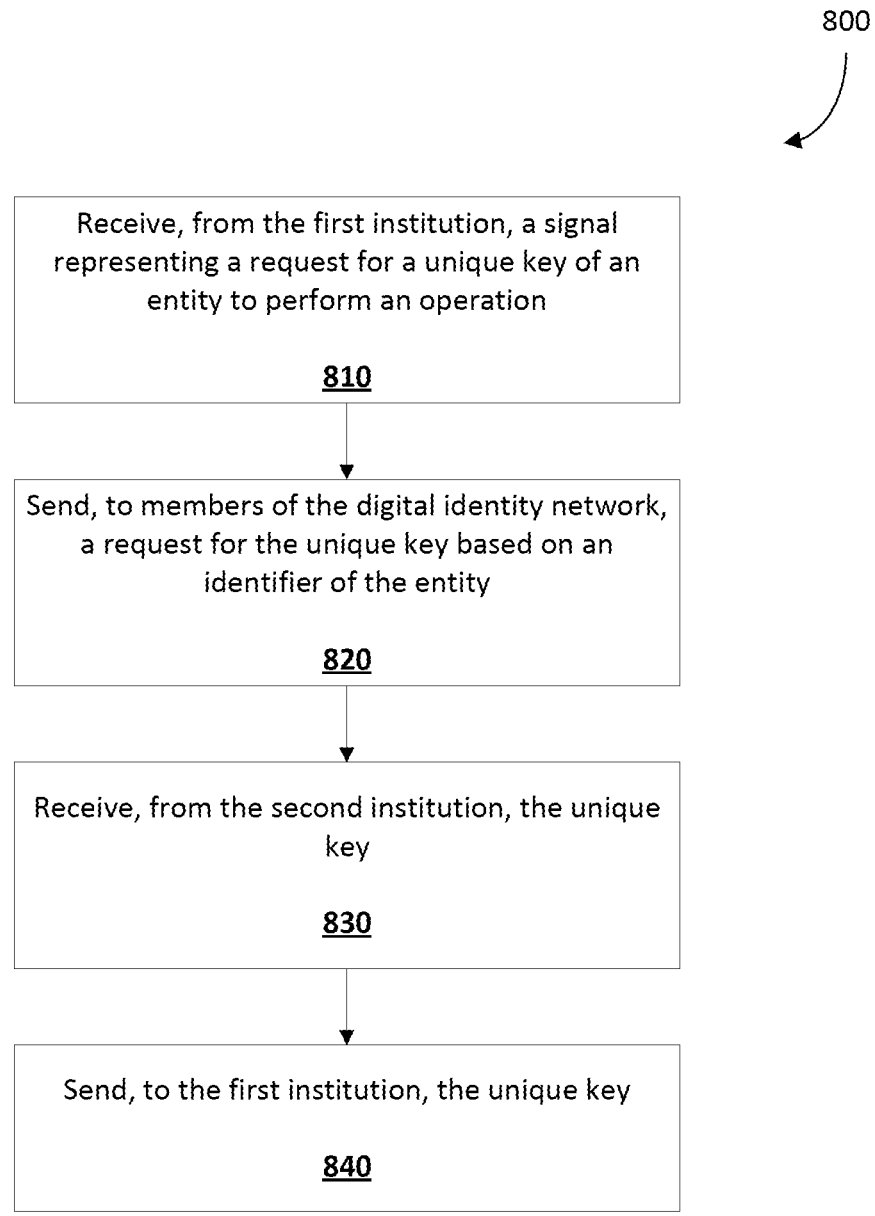
FIG. 8 is a flowchart showing operations performed by a server of a digital identity network according to an embodiment.

The digital identity network 150, in particular a server of the digital identity network 150, receives the request and in response executes a method. FIG. 8 is a flowchart showing operations performed by a server of the digital identity network 150 to obtain the unique key requested by the first server 130. The operations may be included in a method 800 which may be performed by server of the digital identity network 150. For example, computer-executable instructions stored in memory of the server of the digital identity network 150 may, when executed by one or more processors, configure the server of the digital identity network 150 to perform the method 800 or a portion thereof.

The server of the digital identity network 150 receives, via the communications module and from the first server 130, a signal representing a request for a unique key of an entity to perform an operation (step 810). In this embodiment, the signal includes an identifier of the entity and may include information indicating the requested operation.

The server of the digital identity network 150 sends, via the communications module and to servers of all members of the digital identity network 150, a request for the unique key based on the identifier of the entity (step 820). For example, the request may ask a server of each member if they have stored a unique key for a particular entity in their memory. The request may include the name of the authorized user. The request may include information indicating the requested operation.

The server of the digital identity network 150 receives, via the communications module and from the second institution, the unique key (step 830). In this embodiment, the unique key is obtained from the second institution in response to the authorized user indicating consent to perform the operation (the details of which will be described in more detail).

The server of the digital identity network 150 sends, via the communications module and to the first server 130, the unique key (step 840). In this embodiment, the unique key is sent to the first server 130 thereby indicating consent by the authorized user to perform the operation. The unique key may be sent in a blind manner such that the first institution does not know the identity of the second institution providing the unique key.

Referring back to FIG. 5, the first server 130 receives, via the communications module and from the server of the digital identity network 150, the unique key (step 550). As mentioned, the unique key indicates consent by the authorized user to perform the operation.

In response to receiving the unique key, the first server 130 performs the operation (step 560). For example, when the operation is a banking operation such as a request to transfer funds from the account of the entity hosted by first server 130 (at the first institution), the first server 130 completes the transfer.

Embodiments of operations performed by the second server 140 will now be described. As will be appreciated, operations performed by the second server 140 may be performed concurrently with operations performed by the first server 130 and the digital identity network 150 (described above).

Figure 9:
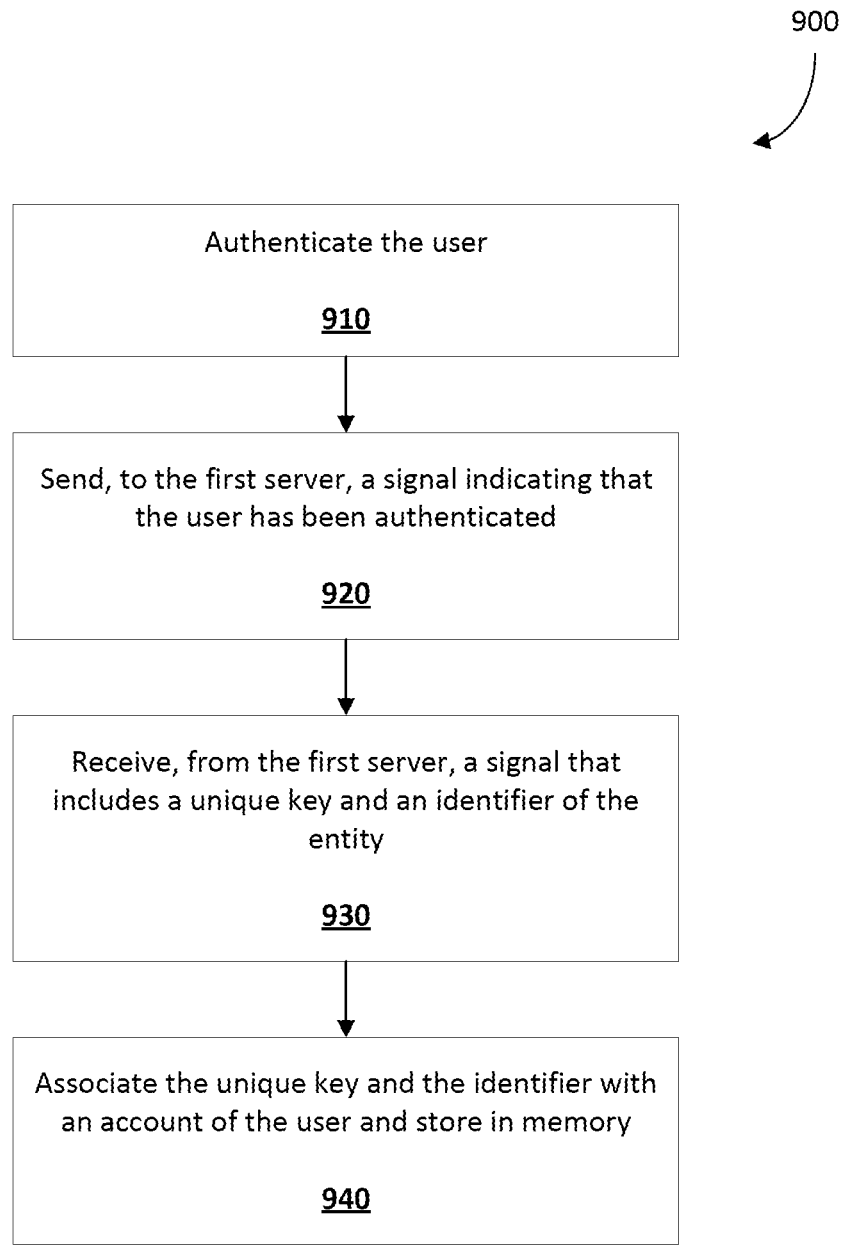
FIG. 9 is a flowchart showing operations performed by a second server in storing a unique key in memory according to an embodiment.

FIG. 9 is a flowchart showing operations performed by the second server 140 according to an embodiment. The operations may be included in a method 900 which may be performed by the second server 140. For example, computer-executable instructions stored in memory of the second server 140 may, when executed by one or more processors, configure the second server 140 to perform the method 900 or a portion thereof.

As mentioned, the first server 130 sends a signal that includes a link which, when selected, directs the second computing device 120 to authenticate the second user at the second institution. The method 900 begins when the second server 140 authenticates the authorized user (step 910). The user may be authenticated through a mobile application associated with the second institution or through a webpage associated with the second institution. During authentication, the user may be required to input authorization information such as a secret (e.g., a password, a personal identification number, etc.), or other identifying data such as, for example, biometric data such as a fingerprint using the second computing device 120.

Once the authorized user has been authenticated, the second server 140 sends, via the communications module and to the first server 130, a signal indicating that the authorized user has been authenticated (step 920). The signal may include identifying information of the second institution. For example, the signal may include an account number of the authorized user which includes identifying information of the second institution.

The second server 140 receives, via the communications module and from the first server 130, a signal that includes the unique key and an identifier of the entity (step 930). The signal may include identifying information of the authorized user.

The second server 140 associates the unique key and the identifier of the entity with an account of the authorized user and stores the unique key and the identifier of the entity in memory (step 940). For example, a database record of the authorized user may be updated to store the unique key and to indicate that the authorized user has a unique key for the entity.

Figure 10:
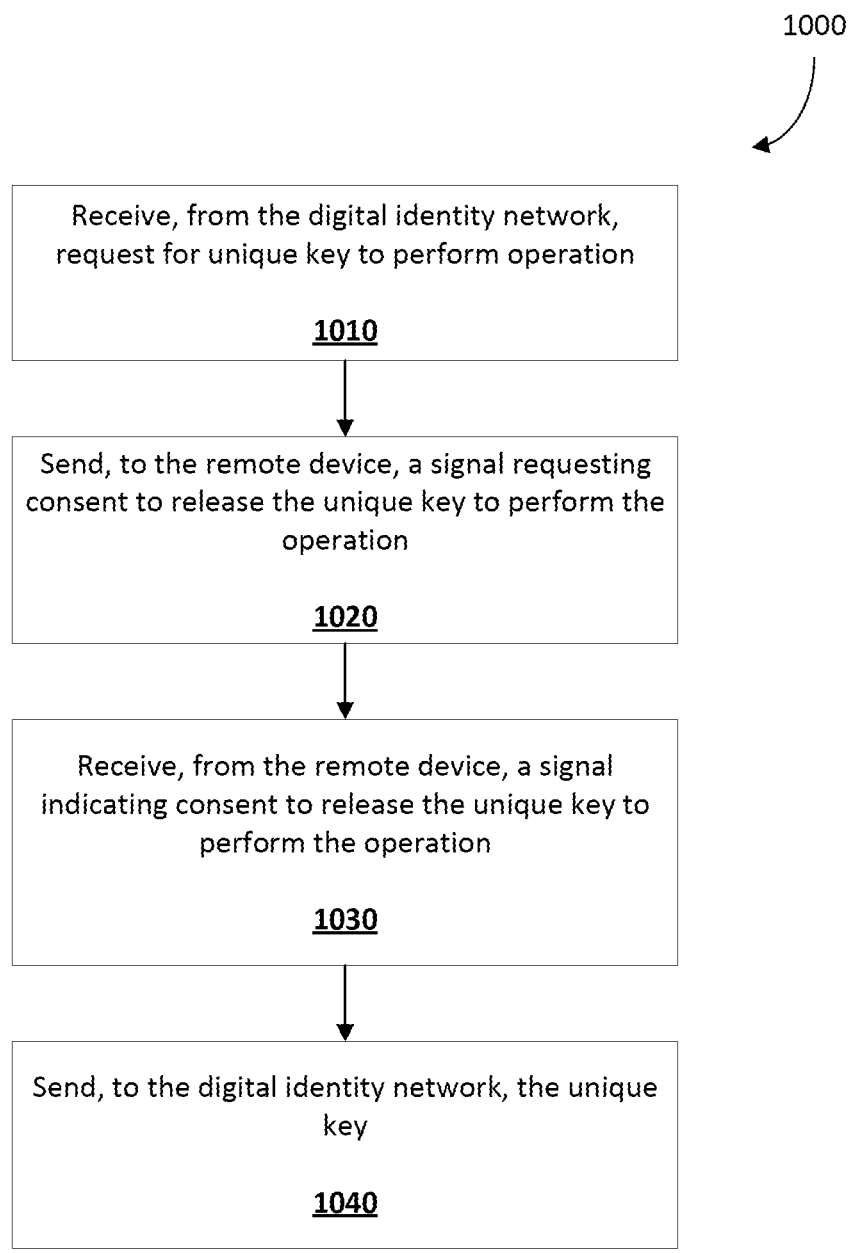
FIG. 10 is a flowchart showing operations performed by a second server in sending a unique key to a server of a digital identity network according to an embodiment.

The unique key is stored in memory of the second server 140. When the second server 140 receives a request for the unique key, for example from the digital identity network 150, the second server 140 may provide the unique key to the digital identity network 150. FIG. 10 is a flowchart showing operations performed by the second server 140 to provide the unique key to the digital identity network 150 according to an embodiment. The operations may be included in a method 1000 which may be performed by the second server 140. For example, computer-executable instructions stored in memory of the second server 140 may, when executed by one or more processors, configure the second server 140 to perform the method 1000 or a portion thereof.

Method 1000 beings when the second server 140 receives, via the communications module and from the digital identity network 150, a request for a unique key indicating consent to perform an operation (step 1010). In this embodiment, the request asks the second server 140 if it has stored a unique key for a particular entity in their memory. The request may include the name of the authorized user and may include information regarding the requested operation.

Figure 11:
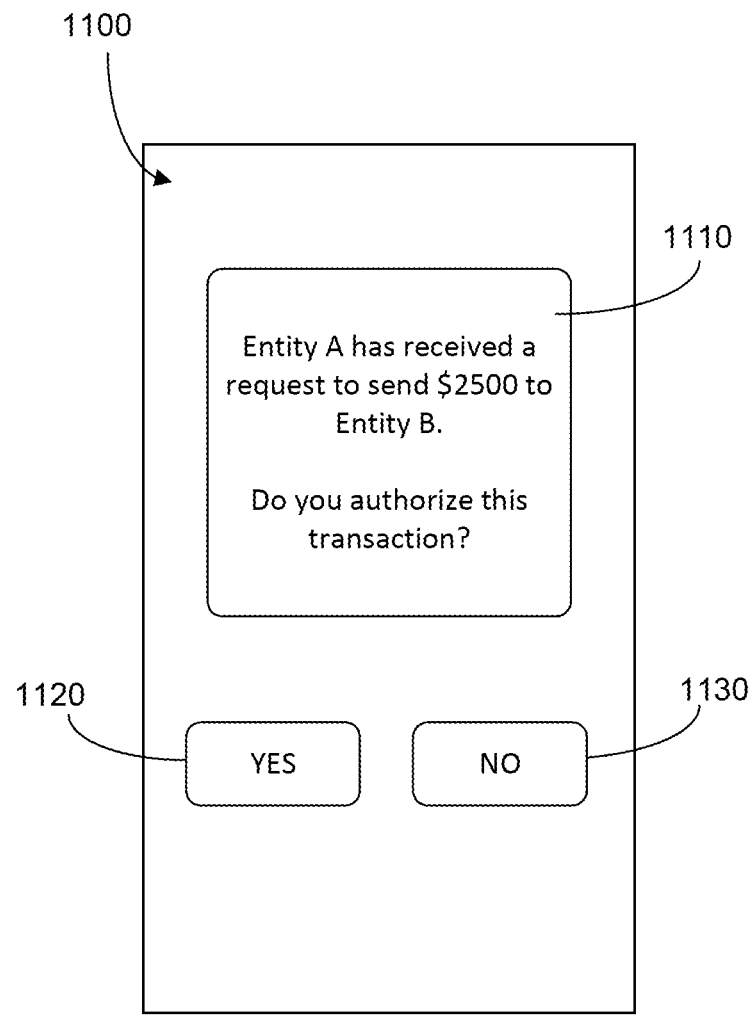
FIG. 11 is an example user interface.

The second server 140 determines that it has the unique key stored in memory and as such the second server 140 sends, via the communications module and to the second computing device 120, a signal requesting consent to release the unique key to perform the operation for the entity (step 1020). In this embodiment, the signal causes the second computing device 120 to display a GUI 1100 shown in FIG. 11. The GUI 1100 includes a text box 1110 providing information regarding the requested operation. The GUI 1100 allows for manipulation of one or more buttons via in input interface (such as a touchscreen) associated with the second computing device 120. Touch gestures, for example, may be used to select one of the buttons. In the example shown in FIG. 11, the GUI 1100 includes a first button 1120 which is used to consent to the requested operation and therefore release the unique key and a second button 1130 which is used to deny the requested operation and therefore not release the unique key.

When the user selects the first button 1120, the second server 140 receives, from the second computing device 120, a signal indicating consent to perform the operation and therefore release the unique key to the digital identity network 150 (step 1030). In response to receiving the signal indicating consent, the second computing device 120 sends the unique key to the digital identity network 150 (step 1040).

As mentioned, the unique key is sent by the digital identity network 150 to the first computing device 110. The unique key indicates the authorized users consent to perform the requested operation.

In another embodiment, a plurality of unique keys may be issued to a plurality of authorized users. A unique key may be provided to an account of each authorized user in a manner similar to that described above. The unique keys may be stored by different institutions. As will be appreciated, one or more of the unique keys may be stored by the same institution.

Figure 12:
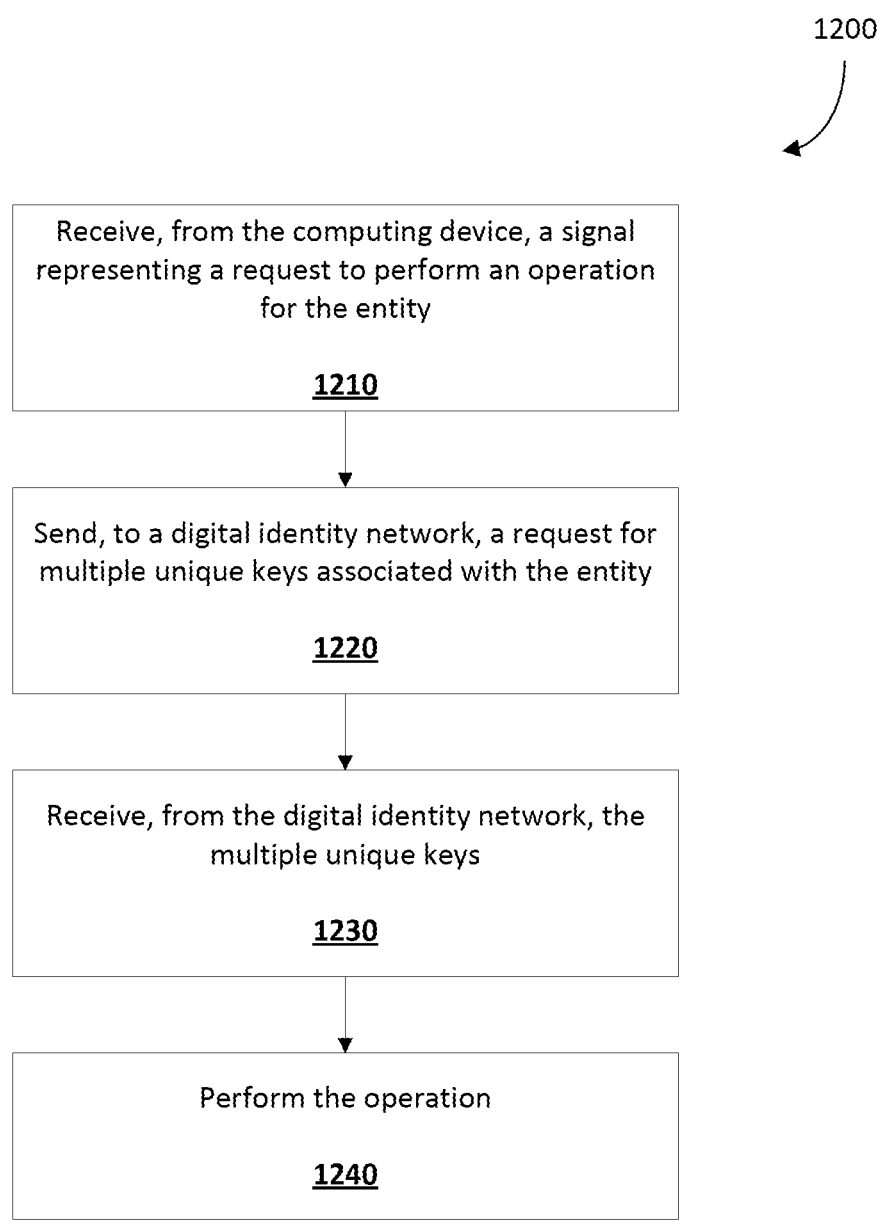
FIG. 12 is a flowchart showing operations performed by a first server in obtaining consent to perform an operation according to an embodiment.

FIG. 12 is a flowchart showing operations performed by the first server 130 when a signal indicating a request to perform an operation is received according to this embodiment. The operations may be included in a method 1200 which may be performed by the first server 130. For example, computer-executable instructions stored in memory of the first server 130 may, when executed by one or more processors, configure the first server 130 to perform the method 1200 or a portion thereof.

The method begins when a signal representing a request to perform an operation for the entity is received (step 1210). This step may be similar to step 530 described above.

The first server 130 sends, via the communications module and to a digital identity network 150, a request for multiple keys associated with the entity (step 1220). In this embodiment, the request is a digital identity request and includes an identifier of the entity. The request may include information regarding the request operation and may include the name of the authorized user.

In response to receiving the request, a server of the digital identity network 150 sends a request for the unique key to the servers of members of the digital identity network 150 in a manner similar to that of method 800 described above.

The first server 130 receives, via the communications module and from the digital identity network 150, the multiple unique keys associated with the entity, each unique key indicating consent from one of the authorized users (step 1230). When all of the unique keys have been received, the operation is performed (step 1240).

It will be appreciated that when one or more of the unique keys have not been received by the first server 130, consent to perform the operation has not been indicated by all authorized users and as such the operation is not performed.

Although in embodiments described above, the unique key is described as being sent directly from the first server 130 to the second server 140, in another embodiment the unique key may be sent from the first server 130 to the second server 140 via the digital identity network 150.

Figure 13:
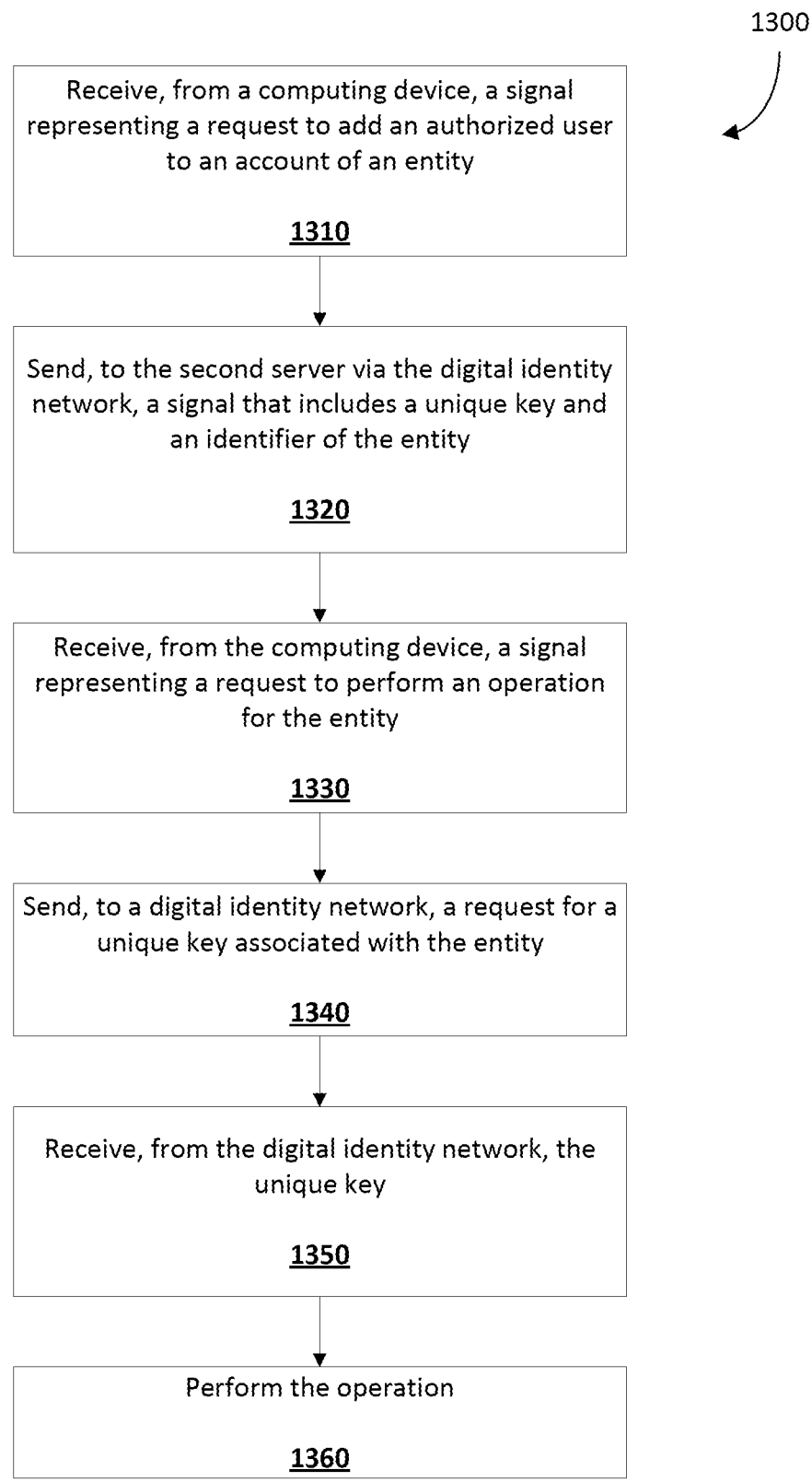
FIG. 13 is a flowchart showing operations performed by a first server in obtaining consent to perform an operation according to an embodiment.

FIG. 13 is a flowchart showing operations performed by the first server 130 according to this embodiment. The operations may be included in a method 1300 which may be performed by the first server 130. For example, computer-executable instructions stored in memory of the first server 130 may, when executed by one or more processors, configure the first server 130 to perform the method 1300 or a portion thereof.

Method 1300 is generally similar to that of method 500 in that steps 1310, 1330, 1340, 1350 and 1360 are generally the same as steps 510, 530, 540, 550 and 560, respectively. During step 1320, rather than sending the unique key directly to the second server 140, as described during step 520, in this embodiment the unique is sent to the second server 140 via the digital identity network 150.

Figure 14:
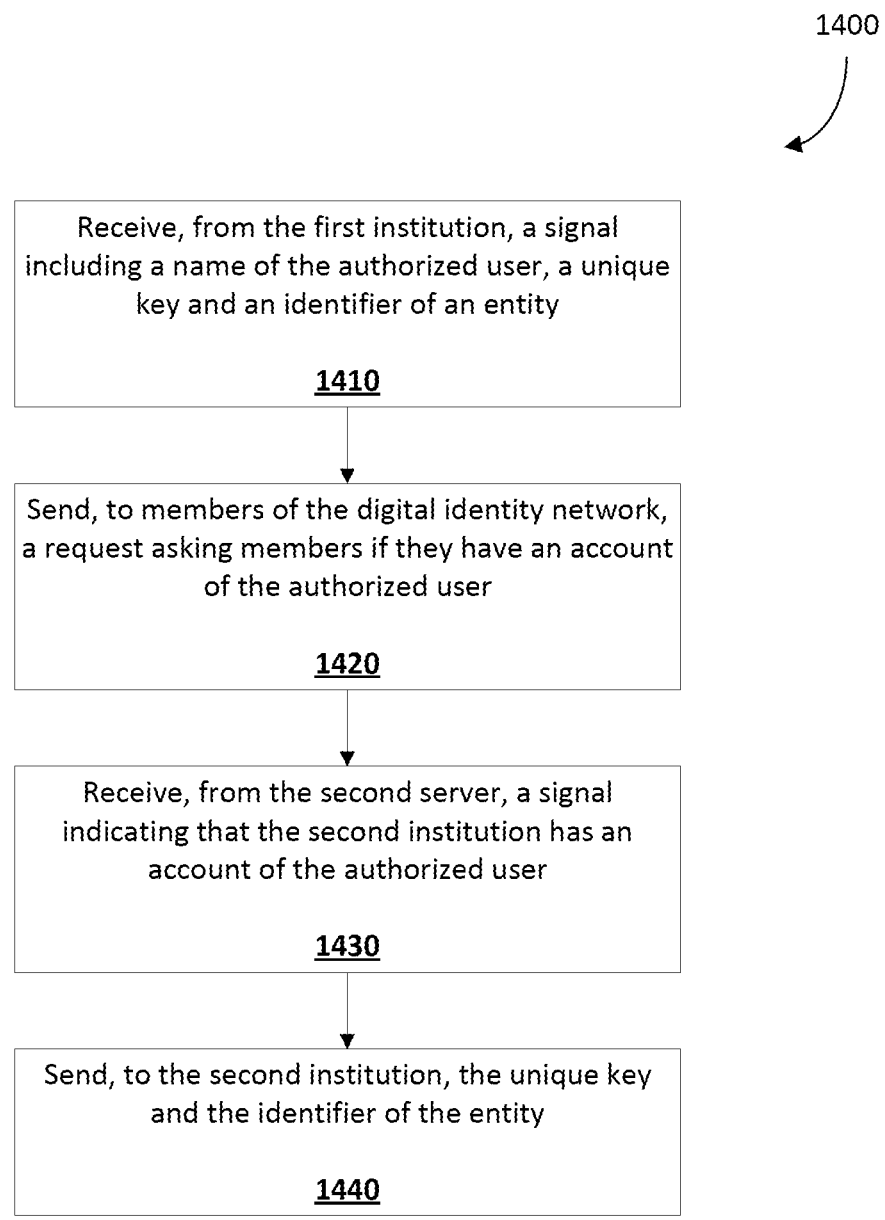
FIG. 14 is a flowchart showing operations performed by a server of a digital identity network according to an embodiment.

FIG. 14 is a flowchart showing operations performed by a server of the digital identity network 150 according to this embodiment. The operations may be included in a method 1400 which may be performed by a server of the digital identity network 150. For example, computer-executable instructions stored in memory of the server of the digital identity network 150 may, when executed by one or more processors, configure the server of the digital identity network 150 to perform the method 1400 or a portion thereof.

In this embodiment, the first user may only be required to provide the name of the authorized user. Once the name of the authorized has been received by the first institution, a signal including the name may be sent from the first server 130 to the digital identity network 150. The signal may also include the unique key and the identifier of the entity.

The signal including the name of the authorized user, the unique key and the identifier of the entity is received by the server of the digital identity network 150 (step 1410).

The digital identity network 150 sends, to the servers of all members of the digital identity network, a request asking the members if they have an account associated with the authorized user (step 1420).

When a server of an institution that is a member of the digital identity network 150 has an account of the authorized user, such as second server 140, the second server 140 may send a signal to the digital identity network 150 indicating that the second institution has an account of the authorized user. The signal may be sent by the second server 140 only after the authorized user has indicated consent to share this information with the digital identity network or after the authorized user has indicated that they are indeed the correct authorized user for the entity. Consent may be indicated by sending a notification through a mobile application or in manners similar to that described above. The digital identity network 150 receives the signal indicating that the second institution has an account of the authorized user (step 1430).

In response, the digital identity network 150 may send a signal including the unique key and the identifier of the entity to the second server 140 (step 1440). In this manner, the first institution does not know an identity of the second institution and the second institution does not know an identity of the first institution. The second server 140 may store the unique key and the identifier in memory in a manner similar to that described above.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted certain adaptations and modifications of the described embodiments can be made. Therefore, the above discussed embodiments are considered to be illustrative and not restrictive.

What is claimed is:

1. A server comprising:
a communications module;
a processor coupled with the communications module; and
a memory coupled to the processor and storing processor-executable instructions which, when executed by the processor, configure the processor to:
receive, via the communications module and from a computing device, a signal representing a request to add an authorized user to an account of an entity hosted by a first institution associated with the server;
generate a unique key used to indicate consent of the authorized user to allow the server to perform an operation associated with the account of the entity with requiring the authorized user to authenticate at a second institution and without requiring the authorized user to authenticate at the first institution; and
send, via the communications module and to a second server associated with the second institution hosting an account of the authorized user, a signal that includes the unique key and an identifier of the entity, the signal causing the second server to store the unique key and the identifier in memory and associate the unique key and the identifier with the account of the authorized user.

2. The server of claim 1, wherein the unique key is stored in memory by the second server such that, in response to the authorized user authenticating at the second institution and indicating consent to allow the server to perform the operation associated with the account of the entity, the unique key is retrieved from the memory and provided to the server to indicate the consent without requiring the authorized user to authenticate at the first institution.

3. The server of claim 1, wherein the processor-executable instructions, when executed by the processor, further configure the processor to:
receive a signal representing a request to perform an operation associated with the account of the entity;
send, via the communications module and to the second server associated with the second institution, a request for the unique key;
obtain, via the communications module and from the second server associated with the second institution, the unique key; and
perform the operation associated with the account of the entity.

4. The server of claim 3, wherein the unique key is obtained after successful authentication of the authorized user at the second institution.

5. The server of claim 1, wherein the processor-executable instructions, when executed by the processor, further configure the processor to:
send, via the communications module and to a remote device associated with the authorized user, a link which, when selected, directs the remote device to authenticate the authorized user at the second institution.

6. The server of claim 5, wherein the processor-executable instructions, when executed by the processor, further configure the processor to:
receive, via the communications module and from the remote device of the authorized user, a signal indicating that the authorized user has been authenticated by the second institution; and
in response to receiving the signal indicating that the authorized user has been authenticated, send the signal including the unique key and the identifier of the entity to the second institution.

7. The server of claim 6, wherein the signal indicating that the authorized user has been authenticated includes an identifier of the second institution.

8. The server of claim 1, wherein the processor-executable instructions, when executed by the processor, further configure the processor to:
receive a signal representing a request to perform an operation associated with the account of the entity;
in response to receiving the request to perform the operation, send, via the communications module and to a digital identity network, a request for the unique key associated with the entity;
receive, via the communications module and from the digital identity network, the unique key; and
in response to receiving the unique key, perform the operation associated with the account of the entity.

9. The server of claim 8, wherein the unique key is received from the digital identity network in a blind manner such that the first institution does not know an identity of the second institution and the second institution does not know an identity of the first institution.

10. The server of claim 1, wherein the unique key is received from the second institution when the authorized user has indicated consent to the operation.

11. The server of claim 1, wherein the signal representing the request to add the authorized user to the account of the entity includes one or more parameters defining permissions granted to the authorized user.

12. The server of claim 11, wherein the permissions include at least one of sending payments, sending payments only to defined parties, and sending payments less than a threshold amount.

13. The server of claim 1, wherein the unique key is one of a plurality of unique keys, each unique key being associated with a different authorized user and wherein the operation is performed when all unique keys have been received.

14. A method comprising:
receiving, via a communications module and from a computing device, a signal representing a request to add an authorized user to an account of an entity hosted by a first institution associated with a first server;
generating a unique key used to indicate consent of the authorized user to allow the server to perform an operation associated with the account of the entity with requiring the authorized user to authenticate at a second institution and without requiring the authorized user to authenticate at the first institution;
sending, via the communications module and to a second server associated with the second institution hosting an account of the authorized user, a signal that includes the unique key and an identifier of the entity, the signal causing the second server to store the unique key and the identifier in memory and associate the unique key and the identifier with the account of the authorized user.

15. The method of claim 14, wherein the unique key is stored in memory by the second server such that, in response to the authorized user authenticating at the second institution and indicating consent to allow the server to perform the operation associated with the account of the entity, the unique key is retrieved from the memory and provided to the server to indicate the consent without requiring the authorized user to authenticate at the first institution.

16. The method of claim 14, further comprising:
receiving a signal representing a request to perform an operation associated with the account of the entity;
sending, via the communications module and to the second server associated with the second institution, a request for the unique key;
obtaining, via the communications module and from the second server associated with the second institution, the unique key; and
performing the operation associated with the account of the entity.

17. The method of claim 16, wherein the unique key is obtaining after successful authentication of the authorized user at the second institution.

18. The method of claim 14, further comprising:
sending, via the communications module and to a remote device associated with the authorized user, a link which, when selected, directs the remote device to authenticate the authorized user at the second institution.

19. The method of claim 18, further comprising:
receiving, via the communications module and from the remote device of the authorized user, a signal indicating that the authorized user has been authenticated by the second institution; and
in response to receiving the signal indicating that the authorized user has been authenticated, sending the signal including the unique key and the identifier of the entity to the second institution.

20. The method of claim 19, wherein the signal indicating that the authorized user has been authenticated includes an identifier of the second institution.

21. The method of claim 14, further comprising:
receiving a signal representing a request to perform an operation associated with the account of the entity;
in response to receiving the request to perform the operation, sending, via the communications module and to a digital identity network, a request for the unique key associated with the entity;
receiving, via the communications module and from the digital identity network, the unique key; and
in response to receiving the unique key, performing the operation associated with the account of the entity.

22. The method of claim 21, wherein the unique key is received from the digital identity network in a blind manner such that the first institution does not know an identity of the second institution and the second institution does not know an identity of the first institution.

23. The method of claim 14, wherein the unique key is received from the second institution when the authorized user indicated consent to the operation.

24. The method of claim 14, wherein the signal representing the request to add the authorized user to the account of the entity includes one or more parameters defining permissions granted to the authorized user.

25. The method of claim 14, wherein the unique key is one of a plurality of unique keys, each unique key being associated with a different authorized user and wherein the operation is performed when all unique keys have been received.

26. A non-transitory computer readable storage medium comprising computer-executable instructions which, when executed, configure a processor to:
receive, via a communications module and from a computing device, a signal representing a request to add an authorized user to an account of an entity hosted by a first institution associated with a first server;
generate a unique key used to indicate consent of the authorized user to allow the server to perform an operation associated with the account of the entity with requiring the authorized user to authenticate at a second institution and without requiring the authorized user to authenticate at the first institution; and send, via the communications module and to a second server associated with the second institution hosting an account of the authorized user, a signal that includes the unique key and an identifier of the entity, the signal causing the second server to store the unique key and the identifier in memory and associate the unique key and the identifier with the account of the authorized user.

* * * * *